US011549206B2

(12) United States Patent
Durrell et al.

(10) Patent No.: US 11,549,206 B2
(45) Date of Patent: Jan. 10, 2023

(54) TEXTILE COMPONENT WITH EMBROIDERED EMBLEM

(71) Applicant: NIKE, Inc., Beaverton, OR (US)

(72) Inventors: Dalton T. Durrell, Portland, OR (US); Chaokun Huangfu, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 690 days.

(21) Appl. No.: 16/535,323

(22) Filed: Aug. 8, 2019

(65) Prior Publication Data

US 2020/0048809 A1 Feb. 13, 2020

Related U.S. Application Data

(60) Provisional application No. 62/716,715, filed on Aug. 9, 2018.

(51) Int. Cl.
*D05C 17/00* (2006.01)
*B32B 5/02* (2006.01)
*B32B 5/26* (2006.01)

(52) U.S. Cl.
CPC ............ *D05C 17/00* (2013.01); *B32B 5/026* (2013.01); *B32B 5/26* (2013.01)

(58) Field of Classification Search
CPC .......... D05C 17/00; D04B 1/24; D04B 21/20; B32B 5/026
See application file for complete search history.

(56) References Cited

U.S. PATENT DOCUMENTS

| 3,463,692 A | * | 8/1969 | Brunner | D05C 17/00 |
| | | | | 112/439 |
| 3,567,567 A | * | 3/1971 | Sherrill | G01N 30/92 |
| | | | | 428/196 |
| 4,788,922 A | * | 12/1988 | Clarius | D06Q 1/00 |
| | | | | 2/244 |
| 5,345,638 A | * | 9/1994 | Nishida | A43D 111/00 |
| | | | | 36/45 |
| 7,574,818 B2 | * | 8/2009 | Meschter | A43B 23/0235 |
| | | | | 36/47 |

(Continued)

FOREIGN PATENT DOCUMENTS

| CN | 203267847 U | 11/2013 |
| CN | 206579239 U | 10/2017 |

(Continued)

OTHER PUBLICATIONS

International Search Report and Written Opinion in Application No. PCT/US2019/045722, dated Jan. 15, 2020, 17 pages.

(Continued)

*Primary Examiner* — Danny Worrell
(74) *Attorney, Agent, or Firm* — Shook, Hardy & Bacon L.L.P.

(57) ABSTRACT

A textile component may include a knitted component with a first knit layer, a second knit layer, and a pocket, where the pocket is located between the first knit layer and the second knit layer. A spacing element may be included, where the spacing element is located within the pocket. An embroidered element on an exterior surface of the first knit layer may be included, where the embroidered element extends through the first knit layer but does not extend through the second knit layer.

18 Claims, 1 Drawing Sheet

(56) References Cited

U.S. PATENT DOCUMENTS

| | | | |
|---|---|---|---|
| 7,870,681 B2* | 1/2011 | Meschter | A43B 23/0235 36/47 |
| 8,418,380 B2* | 4/2013 | Dojan | A43B 5/06 36/47 |
| 8,904,671 B2* | 12/2014 | Dojan | A43B 1/0027 36/47 |
| 9,055,785 B2* | 6/2015 | Dojan | A43B 23/025 |
| 10,583,621 B1* | 3/2020 | Schmidt | A41D 19/0006 |
| 2002/0000684 A1* | 1/2002 | Nakanishi | A41C 5/005 264/292 |
| 2007/0238392 A1 | 10/2007 | Starbuck et al. | |
| 2008/0022554 A1* | 1/2008 | Meschter | A43B 23/0225 36/12 |
| 2010/0043253 A1* | 2/2010 | Dojan | A43B 1/0072 36/47 |
| 2010/0251564 A1* | 10/2010 | Meschter | A43C 5/00 36/28 |
| 2011/0041359 A1* | 2/2011 | Dojan | A43C 1/00 36/47 |
| 2012/0023786 A1* | 2/2012 | Dojan | B32B 7/14 36/25 R |
| 2016/0135543 A1* | 5/2016 | Anceresi | A43B 23/0235 36/45 |
| 2017/0202307 A1 | 7/2017 | Lyke et al. | |
| 2017/0327985 A1* | 11/2017 | Ngene | D04B 15/00 |
| 2019/0017205 A1* | 1/2019 | Luedecke | A43B 23/04 |
| 2020/0048809 A1* | 2/2020 | Durrell | B32B 5/26 |

FOREIGN PATENT DOCUMENTS

| | | |
|---|---|---|
| CN | 107794655 A | 3/2018 |
| DE | 10342285 A1 | 2/2005 |
| DE | 202012100201 U1 | 3/2012 |
| EP | 2792264 A2 | 10/2014 |
| JP | 2000-891 A | 1/2000 |
| JP | 2002-200896 A | 7/2002 |
| JP | 2005-329543 A | 12/2005 |
| TW | I220857 B | 9/2004 |
| TW | M457439 U | 7/2013 |
| WO | 2016/197051 A1 | 12/2016 |

OTHER PUBLICATIONS

Intention to Grant received for European Patent Application No. 19759169.6, dated Dec. 9, 2021, 7 pages.

International Preliminary Report on Patentability received for PCT Patent Application No. PCT/US2019/045722, dated Feb. 18, 2021, 10 pages.

Extended European Search Report received for European Application No. 22172139.2, dated Sep. 21, 2022, 8 pages.

* cited by examiner

TEXTILE COMPONENT WITH EMBROIDERED EMBLEM

RELATED APPLICATIONS

This application claims the benefit of U.S. Provisional Application No. 62/716,715, filed Aug. 9, 2018, which is hereby incorporated by reference in its entirety.

BACKGROUND

A variety of articles are formed from textiles. As examples, articles of apparel (e.g., shirts, pants, socks, footwear, jackets and other outerwear, briefs and other undergarments, hats and other headwear), containers (e.g., backpacks, bags), and upholstery for furniture (e.g., chairs, couches, car seats) are often at least partially formed from textiles. These textiles are often formed by weaving or interlooping (e.g., knitting) a yarn or a plurality of yarns, usually through a mechanical process involving looms or knitting machines.

In some applications, the textile may be embroidered with at least one embroidery element, such as a strand, thread, yarn, or the like (herein referred to as a "strand" when referring to an embroidered element). The embroidery process may be accomplished on a mechanical device called an embroidery machine. Typically, an embroidery machine includes a needle for mechanically manipulating the strand through the base layer of the textile. Usually, the embroidery process occurs after the base layer of the textile is formed, and the embroidery machine is typically separate from the machine used to form the base textile layer (e.g., a knitting machine or a weaving loom). Thus, the embroidery, when incorporated into a knitted component, includes strands that are separate from those used in the knitting process.

DESCRIPTION OF THE DRAWINGS

The present disclosure can be better understood with reference to the following drawings and description. The components in the figures are not necessarily to scale, emphasis instead being placed upon illustrating the principles of the present disclosure. Moreover, in the figures, like-referenced numerals designate corresponding parts throughout the different views.

DETAILED DESCRIPTION

Figure 1:
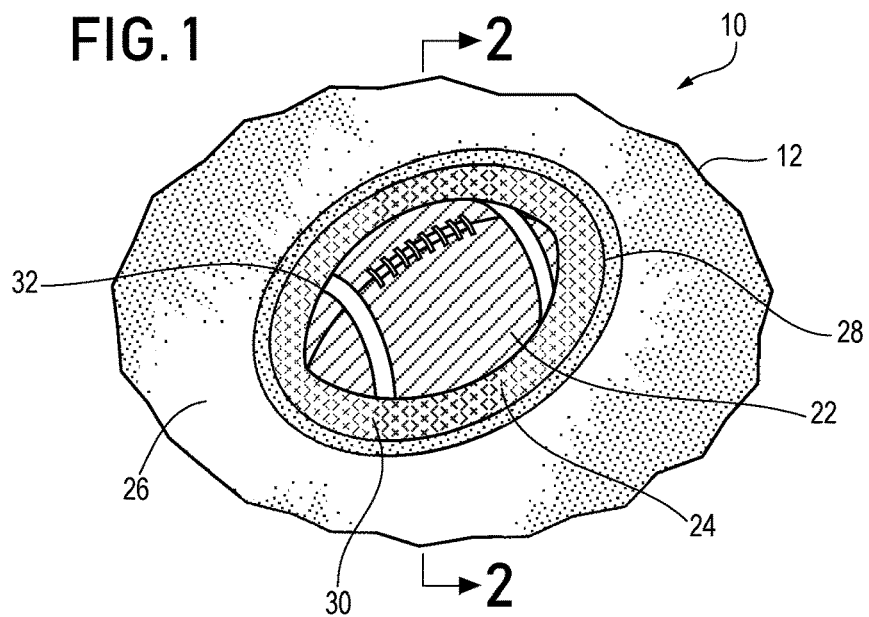
FIG. 1 is an illustration showing a perspective view of a textile component with an embroidery pattern in a cushioning area in accordance with certain aspects of the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional fabrication and assembly.

Certain aspects of the present disclosure relate to uppers configured for use in an article of footwear and/or other articles, such as articles of apparel. When referring to articles of footwear, the disclosure may describe basketball shoes, running shoes, biking shoes, cross-training shoes, football shoes, golf shoes, hiking shoes and boots, ski and snowboarding boots, soccer shoes, tennis shoes, and/or walking shoes, as well as footwear styles generally considered non-athletic, including but not limited to dress shoes, loafers, and sandals.

One general aspect of the present disclosure includes a textile component, including: a knitted component having a first knit layer, a second knit layer, and a pocket, where the pocket is located between the first knit layer and the second knit layer; a spacing element located within the pocket; and an embroidered element on an exterior surface of the first knit layer that extends through the first knit layer but does not extend through the second knit layer.

Another general aspect of the present disclosure includes a textile component, including: a knitted component having a first area with a first knit layer and a second knit layer, and a single-layer boundary area including a fused structure, where the boundary area at least partially surrounds the first area; and an embroidered element that extends through the first knit layer in the first area.

Another general aspect of the present disclosure includes a method, including: knitting a knitted component having a first knit layer and a second knit layer to form a pocket; embroidering an emblem through an external surface of the first knit layer; and including a spacing element within the pocket.

Referring to FIG. 1, a textile component 10 suitable for a number of applications, e.g., footwear, apparel, and industrial textiles, is shown. The textile component 10 includes a knitted component 12, a spacing element 20 (which in some embodiments may be a portion of the knitted component 12 as described below), and an embroidered element 22.

The knitted component 12 may be formed as an integral one-piece element from a single knitting process, such as a weft knitting process (e.g., with a flat knitting machine with one, two, or more needle beds, or with a circular knitting machine), a warp knitting process, or any other suitable knitting process. As used in this application, a yarn may include a strand, and is not intended to limit the present disclosure to multifilament materials. The process that forms the knitted component 12 may substantially form the knit structure of the knitted component 12 without the need for significant post-knitting processes or steps. Alternatively, two or more portions of the knitted component 12 may be formed separately as distinct integral one-piece elements, and then the respective elements may be attached.

The knitted component 12 may incorporate various types of yarn that impart different properties to separate areas of the knitted component 12. That is, one area of the knitted component 12 may be formed from a first type of yarn that imparts a first set of properties, and another area of the knitted component 12 may be formed from a second type of yarn that imparts a second set of properties. In this configuration, properties may vary throughout the knitted component 12 by selecting specific yarns for different areas of the knitted component 12. The properties that a particular type of yarn will impart to an area of the knitted component 12 partially depend upon the materials that form the various filaments and fibers within the yarn. Cotton, for example, provides a soft hand, natural aesthetics, and biodegradability. Elastane and stretch polyester each provide substantial stretch and recovery, with stretch polyester also providing recyclability. Rayon provides high luster and moisture absorption. Wool also provides high moisture absorption, in addition to insulating properties and biodegradability. Nylon is a durable and abrasion-resistant material with relatively high strength. Polyester is a hydrophobic material that also provides relatively high durability. In addition to materials, other aspects of the yarns selected for the knitted component 12 may affect the properties of the knitted component 12. For example, a yarn forming the knitted component 12 may be a monofilament yarn or a multifilament yarn. The yarn may also include separate filaments that are each formed of different materials. In addition, the yarn may include filaments that are each formed of two or more different materials, such as a bicomponent yarn with filaments having a sheath-core configuration or two halves formed of different materials. Different degrees of twist and crimping, as well as different deniers, may also affect the properties of the knitted component 12. Accordingly, both the materials forming the yarn and other aspects of the yarn may be selected to impart a variety of properties to separate areas of the knitted component 12.

The knitted component 12 may include at least a first knit layer 14 and a second knit layer 16. The first knit layer 14 and the second knit layer 16 may be formed on one or more needle beds of a knitting machine, e.g., a first needle bed and/or a second needle bed. At least a portion of the first knit layer 14 may be freely separable from the second knit layer 16 such that a space or pocket 18 is formed therebetween. In other words, the first knit layer 14 and the second knit layer 16 may each have two opposite facing surfaces, and the first knit layer 14 may be freely separable and/or movable relative to the second knit layer 16. Further, an external surface of the first knit layer 14 may generally face a first direction, and an external surface of the second knit layer 16 may generally face the opposite direction, and internal surfaces of the first knit layer 14 and the second knit layer 16 may generally face each other. Although the first knit layer 14 may be freely separable from the second knit layer 16 in certain areas, it does not need to be freely separable everywhere. For example, the knitted component 12 may include one or more interlayer knit stitches (e.g., stitches formed during the same knitting process and extending between a first needle bed and a second needle bed). Such interlayer knit stitches may be formed by the same yarn(s) that forms the first and/or second knit layers 14 and 16, or a different yarn. The portions of the first knit layer 14 and the second knit layers 16 that are freely separable from each other may form an unsecured area 24 where a space or pocket 18 is located between the first knit layer 14 and the second knit layer 16. Portions of the knitted component 12 that do not include separable layers (e.g., where only one layer is included, and/or where multiple layers are included but secured together without a pocket therebetween) may form a secured area 26 (which may herein be referred to as a "base portion" of the knitted component 12). In various non-limiting applications, the first knit layer 14 or the second knit layer 16 may correspond with at least part of an outer or inner layer of an article of apparel or industrial textile, an exterior or interior layer of an upper for an article of footwear, or a layer of another application.

The first knit layer 14 and/or the second knit layer 16 may include one or more materials selected to impart advantageous properties to the knitted component 12. For example, the first knit layer 14 may eventually correspond with an exterior layer of an article of footwear, such as when the article has been assembled and is configured to accommodate the foot of a wearer, and therefore may include courses of a relatively inelastic first yarn providing abrasion resistance, water resistance and/or durability. Suitable materials for the first knit layer 14 may include polyester yarns, e.g., polyester yarns having a maximum tensile strength of at least approximately 0.5 kg-f (e.g., ranging from approximately 0.5 kg-f to approximately 3.0 kg-f) and a linear density of at least approximately 150 denier (e.g., ranging from approximately 150 to approximately 1,500 denier). The first knit layer 14 may also be weatherized, e.g., it may be formed from yarns having water repellant and or resistant properties or it may have a durable water repellent finish.

The second knit layer 16 may eventually correspond with an interior layer of an article of footwear, such as when the article has been assembled and is configured to accommodate the foot of a wearer, and therefore, the second knit layer 16 may include one or more courses of yarn having comfort-related characteristics (e.g., softness), for example a yarn having a napped finish or otherwise provide breathability and comfort to the wearer. Additionally or alternatively, the second knit layer 16 may include one or more elasticized yarns to give resiliency to the knitted component 12. The examples are non-limiting and are intended to illustrate the versatility of the first and second knit layers 14 and 16 which may be formed from the same yarn(s) or different yarns or a combination thereof to provide advantageous properties to the respective layers, and/or different portions, areas or regions of the respective layers, as necessary or desired.

The space 18 between the first knit layer 14 and the second knit layer 16 may receive a spacing element 20, e.g., to enhance strength, provide cushioning protection, generate desired structures for different areas of the knitted component 12, or for other advantages. The spacing element 20 may include cushioning components, and by incorporating the cushioning components within the space 18, the unsecured area 24 of the knitted component 12 is turned into a cushioning area 30 and the secured area 26 surrounding the cushioning area 30 is turned into a fused and/or depressed boundary area 28 (as described in more detail below). In some embodiments, the spacing element 20 may include conventional cushioning components that are inserted into the space 18 within the previously formed knitted component 12. Particular, non-limiting examples of cushioning components may include insert elements composed of foam materials, fluid-filled bladders, or other cushioning elements used singularly or in combination with other elements. By varying the materials and configurations of the cushioning components inserted into the space 18, the dimension, shape, and degree of cushioning of the cushioning area 30 may be varied accordingly.

Figure 2:
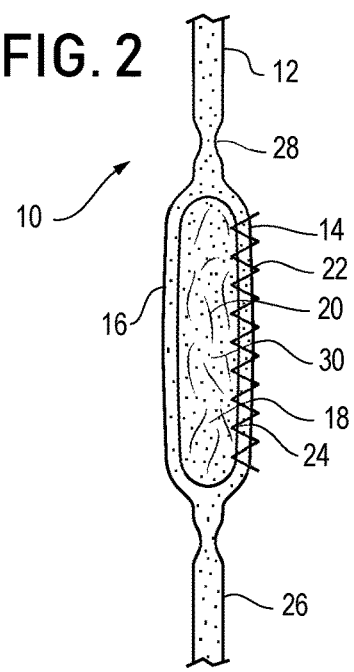
FIG. 2 is an illustration showing a cross-section view of the textile component along the cut line shown in FIG. 1.

In other embodiments, the spacing element 20 may include one or more cushioning yarns (e.g., yarns formed of compactible or other materials that provide cushioning and/or protection) that are inlaid within one or more courses of the knitted component 12. Thus, the spacing element 20 may be incorporated into the knitted component 12 while the first knit layer 14 and the second knit layer 16 are formed (e.g., without the need for inserting a separate cushioning component into the knitted component 12 after knitting processes). The inlaid cushioning yarn(s) located between the first and second knit layers 14 and 16 in the cushioning area 30 may also pass through courses of the knitted component 12 in the secured area 26. In the unsecured area 24, the cushioning yarn(s) may be substantially free to expand to, or remain in, a lofted or expanded state such that a maximum diameter may be reached. For example, as shown in FIG. 2, in the tubular structure of the unsecured area 24, inlaid segments of the cushioning yarn(s) have the freedom to extend radially outward to reach their respective maximum diameters. This may push the first and second knit layers 14 and 16 radially outward to form a "pillow-like" cushion, and the interior space or pocket 18 between the first and second knit layers 14 and 16 may be filled with the material of the cushioning yarn(s). In contrast, the portions of the cushioning yarn(s) that are located in the secured area 26 may remain in a relatively restricted or compressed state such that the maximum diameter of the cushioning yarn(s) is not reached, and thus the cushioning yarn(s) may not be noticeable. The degree of restriction/compression may be varied by varying the stitch density of the knitted component 12, by varying the elasticity of the yarns forming the knitted component 12, etc. In some embodiments, the portions of the cushioning yarn(s) located within the unsecured area 24 are free to expand into a first diameter within the interior volume or space 18 formed between the first and second knit layers 14 and 16, while the portions of the cushioning yarn(s) located within the secured area 26 are restricted by the knitted component 12 to a smaller second diameter. In this manner, the unsecured area 24 may protrude from the secured area 26 that are adjacent to or at least partially surrounding the unsecured area 24 in a visible manner. Similar (or identical) cushioning yarn(s) that form cushioning areas are depicted and described in U.S. Provisional patent application Ser. No. 16/383,275, filed Apr. 12, 2019, which is hereby incorporated by reference in its entirety.

The embroidered element 22 may be stitched on the first knit layer 14 of the knitted component 12 such that it is visible on an exterior surface of the first knit layer 14, thereby forming one or more embroidery patterns 32 (which may be an emblem) in selected locations of the knitted component 12. The embroidered element 22 may include a strand, thread, yarn, or the like. Materials of the embroidered element 22 may include cotton, man-made, polyester, cotton-wrapped polyester, linen, filament polyester, silk, and the like. The embroidery process may be accomplished on a mechanical device called an embroidery machine (or sewing machine), or it may be accomplished by hand. Typically, an embroidery machine includes a needle for mechanically manipulating the embroidered element 22 through a layer, such as the first knit layer 14, of the knitted component 12. Usually, the embroidery process occurs after the knitted component 12 is formed, and the embroidery machine is typically separate from the machine used to form the knitted component 12 (e.g., a knitting machine). The one or more embroidery patterns 32 may include an emblem, which may include a logo, text, another graphic or image, or the like.

The embroidery patterns 32 may have a plurality of appearances made from a plurality of different embroidered elements 22. For example, in the depicted embodiment as shown in FIG. 1, the embroidery pattern 32 is a football, but any other image may be formed (e.g., lettering in a company or product name, etc.). It will be appreciated that the appearance of the embroidery pattern 32 may be varied by varying the size of the embroidered elements 22 used, the type of the embroidered elements 22 used (including the material and color used), the number of the embroidered elements 22 used, the density of the embroidered elements 22 used (e.g., the number of strands per unit length in a direction perpendicular to the longitudinal axis of the strands), the state of the materials of the embroidered elements 22 used (for example, when the same embroidered strands are heat-processed differently), the visual or mechanical properties of the embroidered elements 22 used, or the like.

The textile component 10, which includes the knitted component 12 and the non-knit embroidery pattern 32, provides a variety of advantages. For example, forming embroidering patterns on the knitted component 12 after the knitted component 12 is formed is not limited by the manufacturing process, and thus may enhance the appearance (e.g., including various colors) of patterns relative to other methods of forming an image, and may provide the ability to use enhanced materials (e.g., for better durability). For example, embroidery patterns 32 may additionally or alternatively be configured to exhibit other selected properties, such as a desirable degree of stretchability, flexibility, durability, breathability, weight (as compared to a knit layer), permeability, water-resistance, water repellence, or any other property. Additionally or alternatively, by embroidering patterns on the knitted component, waste may be decreased, recyclability may be simplified, manufacturing efficiency may be increased, and manufacturing costs may be reduced.

The embroidered element 22 may be stitched on the first knit layer 14 within the cushioning area 30 of the knitted component 12 such that the embroidery pattern 32 is spaced from the second knit layer 16 by the spacing element 20. In some embodiments, the configuration (e.g., the shape) of the cushioning area 30 may be substantially the same as the configuration of the embroidery pattern 32 formed thereon, and/or may outline the major features of the embroidery pattern 32. In some embodiments, the cushioning area 30 and the embroidery pattern 32 share respective edges. In other embodiments, the cushioning area 30 and the embroidery pattern 32 may have substantially the same shape while the cushioning area 30 has larger overall dimensions than the embroidery pattern 32 (or vice versa if it is desired for the embroidery pattern 32 to extend beyond the cushioning area 30). The boundary area 28 surrounding the cushioning area 30 also surrounds the embroidery pattern 32 in the cushioning area 30.

The cushioning area 30 may protrude from the boundary area 28, which may be a single-layer depressed and/or fused area relative to the unsecured area 24. This may be advantageous for imparting a three-dimensional visual effect to the embroidery pattern 32 and its background cushioning area 30, thus enhancing the visual prominence of the embroidery pattern 32. The three-dimensional visual effect of the embroidery pattern 32 may be varied by varying the degree of cushioning in the cushioning area 30, which may correspond to the degree of elevation of the cushioning area 30 (and embroidery pattern 32) relative to its surroundings.

Figure 3:
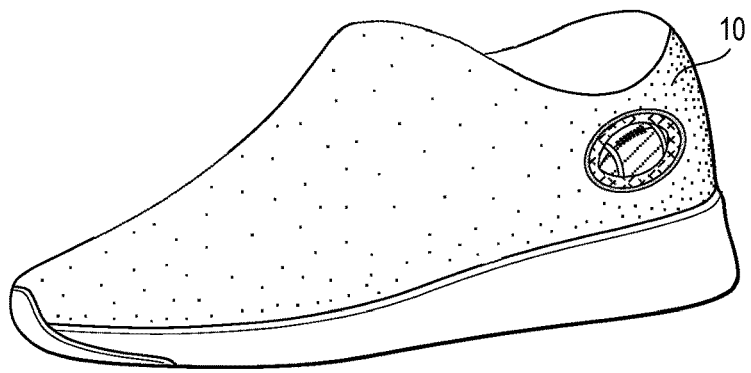
FIG. 3 is an illustration showing a perspective view of an article of footwear having a textile component with an embroidery pattern in a cushioning area in accordance with certain aspects of the present disclosure.

When incorporated into an article of footwear, separating the embroidery pattern 32 from the void (and thus the wearer's foot) by the spacing element 20 may enhance the comfort of the article of footwear since the embroidery pattern 32 (which may be rigid and/or abrasive in some embodiments) will be separated from the void. In addition, when incorporated into an article of footwear, this configuration also allows the embroidery pattern 32 to be located in various portions of the article of footwear. Conventionally, it may be desirable to position the embroidery pattern 32 away from high stress points of the article of footwear to avoid stressing the embroidered elements 22 due to the repeated bending of the wearer's foot. By stitching the embroidery pattern 32 on the first knit layer 14 within the cushioning area 30, the compressibility provided by the spacing element 20 located between the embroidery pattern 32 and the second knit layer 16 may improve the strength of the embroidery pattern 32 (and/or reduce its degree of wear over time), and may impart a desirable degree of stretch-resistance and/or cushioning protection to the embroidery pattern 32, thereby allowing the embroidery pattern 32 to be incorporated into high stress regions of the article of footwear. For example, as shown in FIG. 3, the embroidery pattern 32 may be located in a heel region of the footwear. It will be appreciated that FIG. 3 is representative, and the embroidery pattern 32 may be located in other locations throughout the article of footwear. Similarly, when a similar embroidery pattern 32 and cushioning area 30 are used in an article of apparel or other article, the above-descried configuration may increase the comfort and enhance the mechanical properties of the article of apparel or other article.

In some embodiments, at least a portion of the knitted component 12 may be formed from thermoset polymeric materials and natural fibers, such as cotton, silk, wool, or a thermoplastic polymer material with a relatively high melting point, such as a polyester. In some aspects, the melting point or decomposition temperature of at least a portion of a yarn (or other element) used to form the knitted component 12 is greater than about 140° C., based on one atmosphere pressure, such as greater than about 200° C., and such as greater than 250° C. or higher in certain embodiments.

Additionally or alternatively, in some embodiments, the knitted component 12 may include one or more materials with properties that change in response to a stimulus (e.g., temperature, moisture, electrical current, magnetic field, or light). For example, the knitted component 12 may include yarns formed of one or more thermoplastic polymer materials (including material composites) that transition from a solid state to a softened or liquid state when subjected to certain temperatures at or above the melting point and then transitions back to a solid state when cooled. The thermoplastic polymer material(s) may provide the ability to heat and then cool a portion of the knitted material to thereby form an area of bonded or continuous material (herein referred to as a "fused area") that exhibits certain advantageous properties including a relatively high degree of rigidity, strength, and water resistance, for example. Non-limiting examples of thermoplastic polymer materials are polyurethanes, polyamides, polyolefins, and/or certain nylons. For example, a melting point of a thermoplastic polymer material included in the knitted component 12 may be less than about 200° C., such as less than about 140° C. (e.g., 120° C., which may be optimal (or particularly suitable) for post-knit heat processing). In some embodiments, the embroidered strands of the embroidery pattern 32 may include a thermoplastic polymer material that may be fused after the embroidery process, as described in U.S. patent application Ser. No. 15/591,686, filed May 10, 2017, which is hereby incorporated by reference in its entirety.

In some embodiments, the boundary area 28 that surrounds the cushioning area 30 may be at least partially fused such that the spacing element 20 located within the cushioning area 30 and the embroidery pattern 32 are secured in a desired place. The fused boundary area 28 may be formed by heat-processing thermoplastic polymer materials (which may be included via knitted yarns) around the perimeter of the cushioning area 30. For example, a heat press or plate that has the shape of the boundary area 28 may be used, which may be particularly advantageous because it may depress the boundary area 28 relative to other portions of the knitted component 12. The geometry of the outline of the fused boundary area 28 may be the same as, similar to, or different than the geometry of the outline of the embroidery pattern 32. In some embodiments, the geometry of the outline of the fused boundary area 28 may be substantially the same as the geometry of the outline of the embroidery pattern 32 while the outline of the fused boundary area 28 may have larger overall dimensions than the embroidery pattern 32. In some embodiments, the fused boundary area 28 may have a smoother outline than the embroidery pattern 32.

In general, comparing to unfused areas, fused areas (e.g., the boundary area 28) may have greater stretch-resistance, stability, support, abrasion-resistance, durability, and stiffness, for example. Advantageously, when the textile is incorporated into an article of footwear, these benefits may be achieved without significantly inhibiting the air-permeability of the textile or increasing the weight of the footwear. In some embodiments, the fused boundary area 28 may increase the stiffness of the edges of the cushioning area 30 and the embroidery pattern 32, thereby ensuring that the edges of the cushioning area 30 and the embroidery pattern 32 are uniformly drawn toward each other. The fused boundary area 28 may also help define the embroidery pattern 32, create an attractive appearance of the embroidery pattern 32, and prevent unraveling of the embroidered element 22 that forms the embroidery pattern 32. The stretch-resistance, stiffness, stability, support, abrasion-resistance, and durability provided by the fused boundary area 28 to the edges of the embroidery pattern 32 may be imparted through an alternate procedure, such as by incorporating additional elements surrounding the embroidery pattern 32. Although the additional elements may impart the required properties to the embroidery pattern 32, the additional elements would also increase the expense of manufacturing the textile component 10 and add weight to the textile component 10. In contrast, the fused boundary area 28 beneficially utilize the preexisting textile component 10 to impart the desired properties without utilizing additional elements or increasing the weight. Furthermore, the additional elements are generally formed of materials that are not air-permeable, thereby limiting the overall air-permeability of the textile component 10. The fused boundary area 28 may retain a substantial portion of the air-permeability of the remainder of the textile component 10.

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims. Moreover, the advantages described herein are not necessarily the only advantages of the present disclosure and it is not necessarily expected that every embodiment of the present disclosure will achieve all of the advantages described.

We claim:
1. A textile component, comprising:
a knitted component, the knitted component comprising:
a first knit layer;
a second knit layer;
a pocket, wherein the pocket is located between the first knit layer and the second knit layer;
a spacing element located within the pocket;
an embroidered element on an exterior surface of the first knit layer that extends through the first knit layer but does not extend through the second knit layer; and a boundary area at least partially surrounding the embroidered element, wherein the boundary area comprises a fused structure comprising a fused thermoplastic polymer material.

2. The textile component of claim 1, wherein the spacing element is formed by at least one yarn of the knitted component extending between the first knit layer and the second knit layer.

3. The textile component of claim 1, wherein the spacing element includes an insert element that is separate from the knitted component.

4. The textile component of claim 1, further comprising a cushioning area, wherein an emblem formed by the embroidered element is located within the cushioning area.

5. The textile component of claim 1, wherein the embroidered element includes at least one embroidered strand that is different from yarns forming the first knit layer and the second knit layer of the knitted component.

6. The textile component of claim 1, wherein the fused structure of the boundary area includes a depression on the exterior surface of the knitted component.

7. The textile component of claim 4, wherein the cushioning area and the embroidered element are coextensive.

8. The textile component of claim 4, wherein the cushioning area is elevated relative to a base portion of the knitted component.

9. A textile component, comprising:
a knitted component, the knitted component comprising:
a first area with a first knit layer and a second knit layer; and
a single-layer boundary area comprising a fused structure, wherein the boundary area at least partially surrounds the first area; and
an embroidered element that extends through the first knit layer in the first area.

10. The textile component of claim 9, further comprising a spacing element located between the embroidered element and the second knit layer in the first area.

11. The textile component of claim 9, further comprising an elevated cushioning area surrounded by the boundary area, wherein the embroidered element is located within the cushioning area.

12. The textile component of claim 9, wherein the embroidered element comprises at least one embroidered strand that is different from yarns forming the first knit layer and the second knit layer of the knitted component.

13. The textile component of claim 10, wherein the spacing element is formed by at least one inlaid yarn of the knitted component extending between the first knit layer and the second knit layer.

14. The textile component of claim 10, wherein the spacing element includes an insert element that is separate from the knitted component.

15. The textile component of claim 11, wherein the cushioning area and the embroidered element are coextensive.

16. A method, comprising:
knitting a knitted component having a first knit layer and a second knit layer to form a pocket;
embroidering an emblem through an external surface of the first knit layer;
including a spacing element within the pocket; and
knitting a fusible boundary area at least partially surrounding the emblem, heating the knitted component and then cooling the knitted component to form a fused boundary area.

17. The method of claim 16, wherein the spacing element comprises at least one inlaid yarn of the knitted component.

18. The method of claim 16, wherein the fused structure of the boundary area includes a depression on the exterior surface of the knitted component.

\* \* \* \* \*